(12) United States Patent
Sennett et al.

(10) Patent No.: US 8,190,118 B2
(45) Date of Patent: *May 29, 2012

(54) INTEGRATION OF EMERGENCY ALERT INFORMATION

(75) Inventors: DeWayne Allan Sennett, Redmond, WA (US); Brian Kevin Daly, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 860 days.

This patent is subject to a terminal disclaimer.

(21) Appl. No.: 12/056,115

(22) Filed: Mar. 26, 2008

(65) Prior Publication Data

US 2009/0247116 A1    Oct. 1, 2009

(51) Int. Cl.
*H04M 11/04*    (2006.01)

(52) U.S. Cl. .............. 455/404.1; 455/404.2; 455/456.1; 455/521; 370/506

(58) Field of Classification Search .............. 455/404, 455/404.1, 440, 456.1, 456.3, 456, 404.2, 455/521, 567; 340/506, 539.1, 539.18, 500, 340/3.43, 7.29; 709/223, 224, 218; 370/356, 370/328
See application file for complete search history.

(56) References Cited

U.S. PATENT DOCUMENTS

| | | | |
|---|---|---|---|
| 6,112,075 A | 8/2000 | Weiser | 455/404.1 |
| 6,745,021 B1 | 6/2004 | Stevens | |
| 7,130,610 B2 | 10/2006 | Dolezal et al. | |
| 7,233,781 B2 | 6/2007 | Hunter et al. | |
| 7,411,493 B2 | 8/2008 | Smith | |
| 7,480,501 B2 | 1/2009 | Petite | |
| 2003/0069002 A1* | 4/2003 | Hunter et al. | 455/404 |
| 2003/0143974 A1 | 7/2003 | Navarro | |
| 2003/0216133 A1 | 11/2003 | Poltorak | |
| 2005/0037728 A1 | 2/2005 | Binzel et al. | |
| 2005/0070247 A1 | 3/2005 | Larson | |
| 2005/0086685 A1 | 4/2005 | Rahman et al. | |
| 2005/0162267 A1* | 7/2005 | Khandelwal et al. | 340/506 |
| 2006/0015254 A1 | 1/2006 | Smith | |
| 2006/0040639 A1 | 2/2006 | Karl et al. | 455/404.1 |
| 2006/0234672 A1 | 10/2006 | Adler | |
| 2007/0204064 A1* | 8/2007 | Mail et al. | 709/246 |

OTHER PUBLICATIONS

"US unveils emergency alert system for mobile phones, computers," BREITBART, http://www.breithart.com/article.php?id=060712191204.9i5b29n0&show_article=1, downloaded 2008, 1-2.

(Continued)

*Primary Examiner* — Marivelisse Santiago Cordero
*Assistant Examiner* — Marisol Fahnert
(74) *Attorney, Agent, or Firm* — Woodcock Washburn LLP

(57) ABSTRACT

A subscriber of the Emergency Alert System (EAS) receiving an EAS alert message can obtain additional multimedia information in based upon the location of the subscriber. The additional multimedia information can include information pertaining to available shelter, medical facilities, the location of emergency supplies, a plume map, evacuation routes, or the like. In an example embodiment, the Global Positioning System or other device location systems is utilized to determine the location of the subscriber. The location information along with EAS alert information is used to query a database to obtain the additional information.

18 Claims, 5 Drawing Sheets

OTHER PUBLICATIONS

Botterell, A., "An Advanced EAS Relay Network Using the Common Alerting Protocol (CAP)," http://www.tap.gallaudet.edu/Emergency/Nov05Conference/EmergencyReports/Advanced_EAS_Concept.pdf, 2003, 1-8.

United States Patent and Trademark Office: U.S. Application dated Jan. 18, 2007, U.S. Appl. No. 11/624,503, 23 pages.

United States Patent and Trademark Office: U.S. Application dated Sep. 15, 2006, U.S. Appl. No. 11/532,265, 26 pages.

United States Patent and Trademark Office: U.S. Application dated Sep. 15, 2006, U.S. Appl. No. 11/532,299, 23 pages.

United States Patent and Trademark Office: U.S. Application dated Sep. 15, 2006, U.S. Appl. No. 11/532,367, 29 pages.

U.S. Appl. No. 11/624,503, Non-Final Rejection, dated Dec. 29, 2008, 8 pages.

U.S. Appl. No. 11/624,503, Notice of Allowance, dated Jun. 16, 2009, 6 pages.

* cited by examiner

INTEGRATION OF EMERGENCY ALERT INFORMATION

CROSS REFERENCE TO RELATED APPLICATIONS

The present application is related by subject matter to U.S. patent application Ser. No. 11/624,503, now U.S. Pat. No. 7,602,277, entitled "EMERGENCY ALERT INFORMATION BASED UPON SUBSCRIBER LOCATION," filed Jan. 18, 2007, and also to U.S. patent application Ser. No. 11/532,299 entitled "BROADCAST INITIATED RETREIVAL OF MULTIMEDIA ASSOCIATED WITH AN ALERT," filed Sep. 15, 2006, both of which are hereby incorporated by reference in their entirety.

TECHNICAL FIELD

The technical field generally relates to communications systems and more specifically relates to providing alert information via the Emergency Alert System (EAS) in accordance with a location of a subscriber of the EAS.

BACKGROUND

The Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. A problem, however, is that a recipient of an EAS message may not know how to proceed. For example, a subscriber may receive an EAS message indicating that a tornado is highly likely to occur. The subscriber, however, may not know where available shelter is located. Even worse, in an attempt to flee the area, a subscriber could head into the path of the tornado.

SUMMARY

Emergency Alert System (EAS) information is provided in accordance with a location of an EAS subscriber. The location of the subscriber is utilized to provide, along with the EAS alert message, information pertaining to, for example, available shelter, medical facilities, location of emergency supplies, plume maps, evacuation routes, or the like. In an example embodiment, the Global Positioning System and/or Cellular location technology is utilized to determine the location of the subscriber. The location information along with EAS alert information is used to query a database to obtain information to be provided to the subscriber. The obtained information is provided to the subscriber along with the EAS alert message.

BRIEF DESCRIPTION OF THE DRAWINGS

The foregoing and other objects, aspects and advantages of Emergency Alert System (EAS) emergency alert information based upon subscriber location will be better understood from the following detailed description with reference to the drawings.

DETAILED DESCRIPTION OF ILLUSTRATIVE EMBODIMENTS

In accordance with one embodiment of the invention, information provided to a recipient of emergency information from an Emergency Alert System (EAS) takes the recipient's location into account. For example, if an emergency event is related to a gas leak or the like, the recipient can be provided a plume map and/or information pertaining to the plume map indicating the current and/or projected area of coverage of the gas. Based upon the recipient's current location, the information can contain a variety of useful information, such as an evacuation route, locations of shelters, locations of medical facilities, locations of medical supplies, locations of other support facilities, phone numbers, email addresses, or the like.

Figure 1:
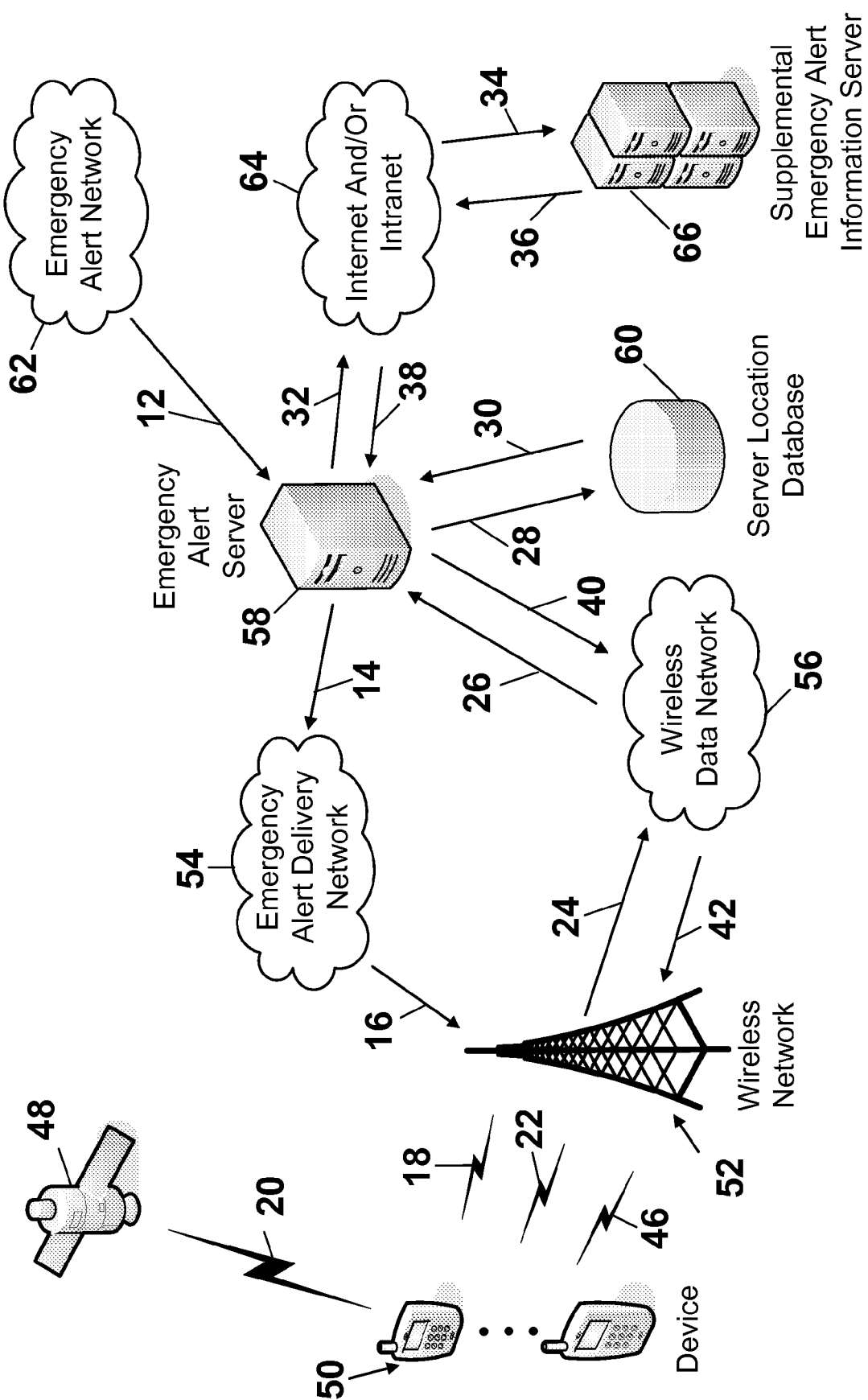
FIG. 1 is a flow diagram of an example system and process for providing EAS emergency alert information based upon subscriber location.

FIG. 1 is a flow diagram of an example system and process for providing EAS information in accordance with the current location of an EAS recipient. In the embodiment of FIG. 1, it is contemplated that the recipient is a person carrying a mobile device, and that the EAS information is provided to the mobile device. In such embodiments, the recipient may be referred to as a "subscriber." The term subscriber refers to a subscriber to a mobile communications agreement, such as a cellular telephone contract, and/or a subscriber to an EAS information service. At step 12, the emergency alert server 58 receives, from the emergency alert network 62, an indication of an emergency alert associated with an alerting area. The alerting area can comprise any appropriate area, such as a geographical area, a group of subscribers, or a combination thereof for example. For example, an alert area can be defined in accordance with geographic code references such as the Federal Information Processing Standard (FIPS), ZIP codes, the National Weather Service Specific Area Message Encoding (SAME) codes, and/or the Geographic Information System (GIS) Alert Mapping Service. An alert area can comprise a group of subscribers, such as, for example, a group of subscribers belonging to the same organization (e.g., group of subscribers employed at a medical facility).

At step 14, the emergency alert server 58 provides, to the emergency alert delivery network 54, the indication of the emergency alert and the associated alert area. As described in more detail below, the emergency alert delivery network 54 can comprise any appropriate network, such as a wired network and/or a wireless network, for example. In an example embodiment the emergency alert delivery network comprises a Short Message Service (SMS) network, Cell Broadcast network, a Multimedia Broadcast/Multicast Service ("MBMS"), and/or video broadcast network, such as Digital Video broadcast-Handheld ("DVB-H"), an IP Multicast network, and MediaFLO network, an FM radio network, a National Oceanographic and Atmospheric Administration (NOAA) National Weather Service Radio All Hazards (NWR) network, and a Mobile TV network, or combination thereof). The emergency alert delivery network 54 provides, at step 16, the indication of the emergency alert and the associated alert area to the wireless network 52. As described in more detail below, the emergency alert deliver network can comprise any appropriate network, such as a wired network and/or a wireless network, for example. In an example embodiment, as described in more detail below, the wireless network 52 comprises a Global System for Mobile Communications (GSM) network, a Universal Mobile Telecommunications System (UMTS) network, a Code Division Multiple Access (CDMA) network, a CDMA-2000 network, an Integrated Digital Enhanced Network (iDEN) network, a WiFi network, a Worldwide Interoperability for Microwave Access (WiMAX) network, or a combination thereof).

At step 18, the wireless network 52 provides, to the devices 50 within the alert area, the indication of the emergency alert. The devices 50 are representative of any appropriate type of device, or devices, that can be utilized to receive the indication of the emergency alert from the wireless network 52. The devices 50 can represent a mobile device. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). The devices 50 also can represent non-mobile devices, such as devices fixed in homes to receive the alerts.

The devices 50 can comprise any combination of any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The devices 50 receives, at step 20, information pertaining to the location of the devices 50. As depicted in FIG. 1, location information is received from a satellite, or satellites, such as a Global Positioning System (GPS). Location information can be received from any appropriate source and in accordance with any appropriate location determination technique. The location information can be received in response to receiving (at step 18) the indication of the emergency alert and/or the location information can be previously stored in the devices 50. The location information can be automatically obtained (e.g., in response to receiving, at step 18, the indication of the emergency alert) and/or the location information can be obtained manually by a user of the devices 50. For example, in response to receiving the indication of the emergency alert at step 18, the devices 50 can automatically obtain the location of the devices 50. The location information can be obtained from memory in the devices 50 and/or from a source external to the devices 50, such as from a GPS satellite, or satellites, or by mobile device location techniques presently in use, which involve triangulating a mobile device location from signals received at cellular radio communications towers. The location of the devices 50 can be represented in any appropriate format, such as a ZIP code, latitude and longitude, or the like, for example. It is to understood that the phrases "location of the subscriber," "location of the device," and "location of the devices," are used interchangeably to mean location of the intended recipient, or recipients, of additional information.

Additional information is requested by the devices 50, at step 22. The additional information can be automatically requested by the devices 50 in response to receiving location information (at step 20) and/or the additional information can be requested manually by the user of the devices 50. The request for additional information includes an indication of the location information. In an example embodiment, the request for information comprises information indicative of the type of emergency and/or information indicative of the type of subscriber (e.g., the user of the devices 50 that is subscribed to the EAS). Information indicative of the type of subscriber can comprise, for example, an indication that the subscriber is or is not a member of the national security community and/or a member of the emergency preparedness community (NS/EP personnel). Non-NS/EP personnel could receive location specific information such as evacuation routes, locations of shelters, and locations of medical facilities. NS/EP personnel could alert specific information such as location of the event, movement of any hazardous materials (e.g., speed and direction of toxic clouds), and information that would not be provided to the general public, such as specific detailed information about the hazardous materials (e.g., Material Safety Data Sheet "MSDS"), mortality rates in the alerting areas, prognosis of victims exposed to the hazard, or the like. Thus, in an example embodiment, the request for additional information comprises an indication of the location of the devices 50 and/or an indication of the alert area, an indication of the type of subscriber, and an indication of the type of emergency. The wireless network 52 provides, at step 24, to the wireless data network 56, the request for additional information. At step 26, the wireless data network 56 provides, to the emergency alert server 58, the request for additional information.

At step 28, the emergency alert server 58 provides, to the server location database 60, a request for additional information. The server location database 60 can comprise any appropriate database of group of databases. In an example embodiment, the emergency alert server 58 queries the server location database 60 utilizing the indication of the location of the devices 50 and/or an indication of the alert area, the indication of the type of subscriber, and the indication of the type of emergency. The emergency alert server 58 queries the server location database 60 to determine the location, such a URL or other appropriate routable address, of a supplemental emergency alert information server. In response to the query, the server locations database 60 determines a location or locations, such as a URL or other routable address (e.g., IP address) of an appropriate supplemental emergency alert information server. The server location database 60 provides, at step 30, to the emergency alert server 58, the location or locations, of an appropriate supplemental emergency alert information server (e.g., supplemental emergency alert information server 66).

At step 32, the emergency alert server 58 provides to the internet and/or intranet 64, a request for additional information. The request is provided, via the internet/intranet 64, to the location or locations, of the supplemental emergency alert information server 66 as determined by the server location database 60. If not already established, the emergency alert server 58 establishes a connection with the internet/intranet 64 prior to providing the request for additional information to the internet/intranet 64. At step 34, the internet/intranet 64 provides, to the supplemental emergency alert information server 66, the request for additional information. In an example embodiment, the request for information comprises the indication of the location of the devices 50 and/or an indication of the alert area, the indication of the type of subscriber, and the indication of the type of emergency.

Utilizing the indication of the location of the devices 50 and/or an indication of the alert area, the indication of the type of subscriber, and the indication of the type of emergency, the supplemental emergency alert information server 66 obtains appropriate additional information. The supplemental emergency alert information server 66 can obtain the additional information from any appropriate source, such as storage in the supplemental emergency alert information server 66 and/or storage external to the supplemental emergency alert information server 66. The supplemental emergency alert information server 66 also can generate additional information in accordance with information provided thereto (e.g., the location of a mobile device and/or an indication of the alert area, an indication of the type of subscriber, an indication of the type of emergency). The additional information can comprises any appropriate content based on the location of the subscriber/subscriber's device. For example, the content of the additional information can include information pertaining to available shelter, medical facilities, location of emergency supplies, plume maps, evacuation routes, other support facilities, phone numbers, email addresses, or a combination thereof.

At step 36, the supplemental emergency alert information server 66 provides, to the internet/intranet 64, the additional information. At step 38, the internet/intranet 64 provides, to the emergency alert server 58, the additional information. The emergency alert server 58, at step 40 provides, to the wireless data network 56, the additional information. At step 42, the wireless data network 56 provides, to the wireless network 52, the additional information for distribution to the devices 50 at step 46.

Each of the emergency alert server 58 and the supplemental emergency alert server 66 can comprise any appropriate type of processor. The emergency alert server 58 and the supplemental emergency alert server 66 can each be implemented in separate processors, in a single processor, or a combination thereof. Further, each processor can be implemented as a single processor or multiple processors. Multiple processors can be distributed or centrally located. Multiple processors can communicate wirelessly, via hard wire, or a combination thereof. Examples processors include mobile communications devices, mobile telephones, personal digital assistants (PDAs), lap top computers, handheld processors, or a combination thereof. The server location database 60 can comprise any appropriate type of database. The server location database 60 can be implemented as a single database or multiple databases. Multiple databases can be distributed or centrally located. Multiple databases can communicate wirelessly, via hard wire, or a combination thereof. Further, the emergency alert server 58, the supplemental emergency alert server 66, and the server location database 60 can be implemented in any combination.

Figure 2:
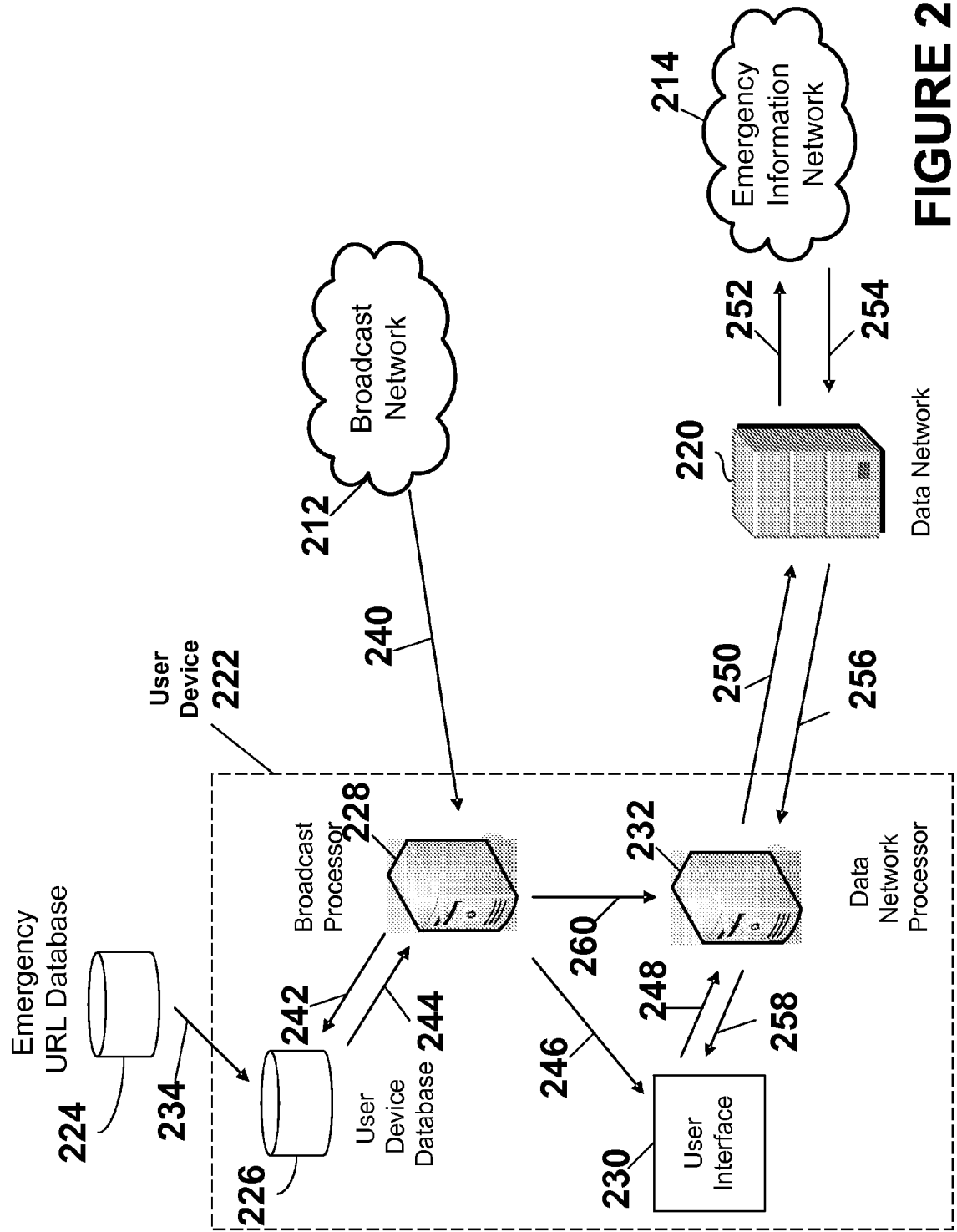
FIG. 2 is flow diagram of an example process and system for retrieving multimedia associated with an alert in response to a broadcast of the alert.

FIG. 2 is flow diagram of an example process and system for retrieving multimedia associated with an alert in response to a broadcast of the alert, as may be used in combination with the above described system and process for providing EAS emergency alert information based upon subscriber location. FIG. 2 provides one embodiment of multimedia delivery, wherein the content of the multimedia can be based on subscriber location using techniques such as those described above. In the embodiment of FIG. 2, an alert, such as an alert message from the Emergency Alert System (EAS), is distributed via broadcast delivery mechanisms such as National Oceanic and Atmospheric Administration (NOAA) National Weather Radio, AM/FM radio broadcasts, mobile TV broadcasts, satellite radio, and the like. In an example embodiment, the broadcast alert triggers the retrieval of multimedia associated with the alert. Upon receipt of the broadcast alert, the type of alert is determined. A location of multimedia is determined in accordance with the type of alert. For example, in the gas leak situation outlined above, appropriate multimedia could be an appropriate plume map overlaid on a map showing evacuation routes. If appropriate, video could be integrated showing motion of the plume and or directing the subscriber to the evacuation routes. The multimedia is retrieved at the determined location. The multimedia can be retrieved manually (e.g., by a user) or automatically (e.g., by a device).

Multimedia can be provided according to recipient capabilities. Various different multimedia, such as text, a picture, video, and/or audio, associated with emergency alerts can advantageously depend on capabilities of the person receiving the multimedia and/or the device receiving the multimedia. For example, a first responder or an emergency manager at a disaster site or emergency situation could benefit from receiving multimedia information associated with a alert pertaining to the disaster/emergency. Multimedia such as maps, graphics, video clips, audio clips, and still pictures can aid the first responder/manager in better assessing the situation and directing others. In this regard, different multimedia can be compiled for the first responder recipient capability, which is a different subscriber type than that of the average civilian. A first multimedia may be compiled for a first responder, said multimedia providing directions to the emergency location along with appropriate data for addressing the emergency, while a second multimedia can be compiled for the average citizen with information addressing common questions on a "need to know" basis and further providing evacuation routes and data for appropriate civilian response. Similarly, different multimedia can be provided to different device types depending on recipient device capabilities. For example, a cellular telephone with limited graphics capability can receive a simple picture, voice recording, and/or short video, while an in-dash navigation system can receive a longer video with more multimedia information. Information regarding recipient capabilities, whether those of the person or those of the device, can be provided to appropriate servers by the device so that appropriate multimedia is returned.

FIG. 2 is a flow diagram of an example process and system for retrieving multimedia associated with an alert in response to a broadcast of the alert. In an example embodiment, an alert message is delivered to a user device 222 via a broadcast network 212. The broadcast network 212 can comprise any appropriate non-cellular broadcast network, such as National Oceanic and Atmospheric Administration (NOAA) National Weather Radio, AM/FM radio broadcasts, mobile TV broadcasts, satellite radio, or a combination thereof, for example. The user device 222 comprises a preprovisioned user device database 226 having stored therein predetermined locations from which multimedia can be retrieved, such as associated addresses (e.g., Uniform Resource Locator, URL, addresses) of multimedia information based upon alert message type. A list of associated URL addresses for related multimedia information is generated in accordance with the preprovisioned user device database 226. Thus, a respective location from which multimedia can be retrieved is generated for each alert type. The list is provided to the user, and the user selects from the list, specific multimedia information.

Prior to the occurrence of an event resulting in an alert (e.g., an emergency event), at step 234, locations, such as URL addresses for multimedia emergency alert information, are downloaded to the user device database 226 from an emergency URL database 224. Predetermined locations (e.g., URL addresses) are generated by associating a respective location from which multimedia can be retrieved for each alert type. Thus, for each alert type, the user device database 226 has stored therein, a URL address, or addresses, associated with the alert type, and from which multimedia associated with the alert can be retrieved. The emergency URL database 224 can comprise any appropriate network, processor, storage means, or the like, capable of storing and providing URL addresses associated with multimedia information pertaining to an alert. Upon the occurrence of an event, such as an emergency or the like, the broadcast network 212 broadcasts, at step 240, an indication of the emergency.

In the illustrated embodiment, the broadcast of the indication of the alert is received by the broadcast processor 228. The broadcast network processor 228 determines the type of emergency, or the like, based upon the received broadcast emergency alert message. The broadcast processor 228 requests, at step 242, the list of associated URL addresses from the user device database 226. The user device database 226 retrieves the list of URL addresses associated with the indicated type of emergency, or the like, and returns, at step 244, the list of URL addresses to the broadcast processor 228.

In an example embodiment, the user decides whether to retrieve the multimedia and selects which URL from which to retrieve the multimedia. In an alternate embodiment, multimedia data could be retrieved from any location, such as from a device hard drive that is pre-populated with multimedia for display in certain emergency conditions. In accordance with the illustrated embodiment, at step 246, the indication of the alert along with the indication of the location of multimedia associated with the alert are provided to the user interface 230. The user interface 230 renders the alert message in textual format. The user interface 230 also renders the locations of the multimedia. In an example embodiment, the user interface 230 renders a link, or links, to a URL, or URLs, from which multimedia can be retrieved. If the user decides to retrieve the multimedia, the user selects the link, or links, from which to retrieve the multimedia.

At step 248, an indication of the user's selection is provided to the data network processor 232. The data network processor 232 establishes a connection with the data network 220, if a connection is not currently established. At step 250, the data network processor 232 provides to the data network 220, the URL address(es) selected by the user. The data network 220, at step 252, using the selected URL address, establishes a connection with an emergency information network 214. The data network 220 establishes the connection with the location in the emergency information network 214 indicated by the selected URL(s). The data network 220, also at step 252, requests retrieval of the multimedia located at the selected URL(s) in the emergency information network 214. The emergency information network 214, at step 254, provides the requested multimedia information to the data network 220. The data network 220 provides the requested multimedia information to the data network processor 232, at step 256. The data network processor 232 provides the requested multimedia information to the user interface 230 for rendering. In various embodiments, multimedia information associated with each selected URL can be retrieved individually, multimedia information associated with a subset of the selected URLs can be retrieved, or multimedia information associated with all the selected URLs can be retrieved.

In another example embodiment, the user device 222 automatically retrieves the multimedia information using the generated list of URL addresses. In this embodiment, steps 240, 242, and 244 occur as described above. At step 246, however, the indication of the alert, without the indication of the location of multimedia associated with the alert, is provided to the user interface 230 for rendering. The broadcast processor 228 extracts the list of URL addresses from the information provided by the user device database 226 (at step 244) and requests the data network processor 232 to retrieve the associated multimedia information. At step 250, the data network processor 232 provides to the data network 220, the URL address(es) extracted by the cellular network processor 228.

At this point, steps 252, 254, and 256, occur similarly as described above. That is, the data network 220, at step 252, using the extracted URL address, establishes a connection with an emergency information network 214. The data network 220 establishes the connection with the location in the emergency information network 214 indicated by the selected URL(s). The data network 220, also at step 252, requests retrieval of the multimedia located at the extracted URL(s) in the emergency information network 214. The emergency information network 214, at step 254, provides the requested multimedia information to the data network 220. The data network 220 provides the requested multimedia information to the data network processor 232, at step 256. The data network processor 232 provides the requested multimedia information to the user interface 230 for rendering. In various embodiments, multimedia information associated with each selected URL can be retrieved individually, multimedia information associated with a subset of the selected URLs can be retrieved, or multimedia information associated with all the selected URLs can be retrieved.

The user device 222 can comprise any appropriate user device. For example, the user device 222 comprise a mobile device, a portable device, a variety of computing devices including (a) a portable media player, e.g., a portable music player, such as an MP3 player, a walkmans, etc., (b) a portable computing device, such as a laptop, a personal digital assistant ("PDA"), a portable phone, such as a cell phone of the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof.

The user device 222 can comprise a system comprising an input/output portion, a processing portion, and a memory portion. In an example embodiment the memory portion comprises the user device database 226 and/or any memory associated with the broadcast processor 228, the data network processor 232, the user interface 230, or a combination thereof, for example. The processing portion can comprise the broadcast processor 228, the data network processor 232, or any appropriate portions thereof, for example. The input/output portion can comprise any appropriate portions of the user device database 226, the broadcast processor 228, and the data network processor 232, that interface with the emergency URL database 224, the broadcast network 212, and the data network 220.

It is emphasized that the diagram depicted in FIG. 2 of the user device 222 is exemplary and not intended to imply a specific implementation. Thus, the user device 222 can be implemented in a single processor or multiple processors. Multiple processors can be distributed or centrally located. Multiple processors can communicate wirelessly, via hard wire, or a combination thereof.

The user device 222 can be operable with any appropriate telephony radio network. The following description sets forth some exemplary telephony radio networks, such as the global system for mobile communications (GSM), and non-limiting operating environments. The below-described operating environments should be considered non-exhaustive, however, and thus the below-described network architectures merely show how retrieving multimedia associated with an alert in response to a broadcast of the alert can be incorporated with existing network structures and architectures. It can be appreciated, however, that retrieving multimedia associated with an alert in response to a broadcast of the alert can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of retrieving multimedia associated with an alert in response to a broadcast of the alert can be applied independently of the method of data transport, and do not depend on any particular network architecture, or underlying protocols.

The following description sets forth some exemplary telephony radio networks and non-limiting operating environments for providing emergency alert information based upon subscriber location. The below-described operating environments should be considered non-exhaustive, however, and thus the below-described network architectures merely show how providing emergency alert information based upon subscriber location may be incorporated into existing network structures and architectures. It can be appreciated, however, that providing emergency alert information based upon subscriber location can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of providing emergency alert information based on subscriber location can be applied independently of the method of data transport, and do not depend on any particular network architecture, or underlying protocols.

Figure 3:
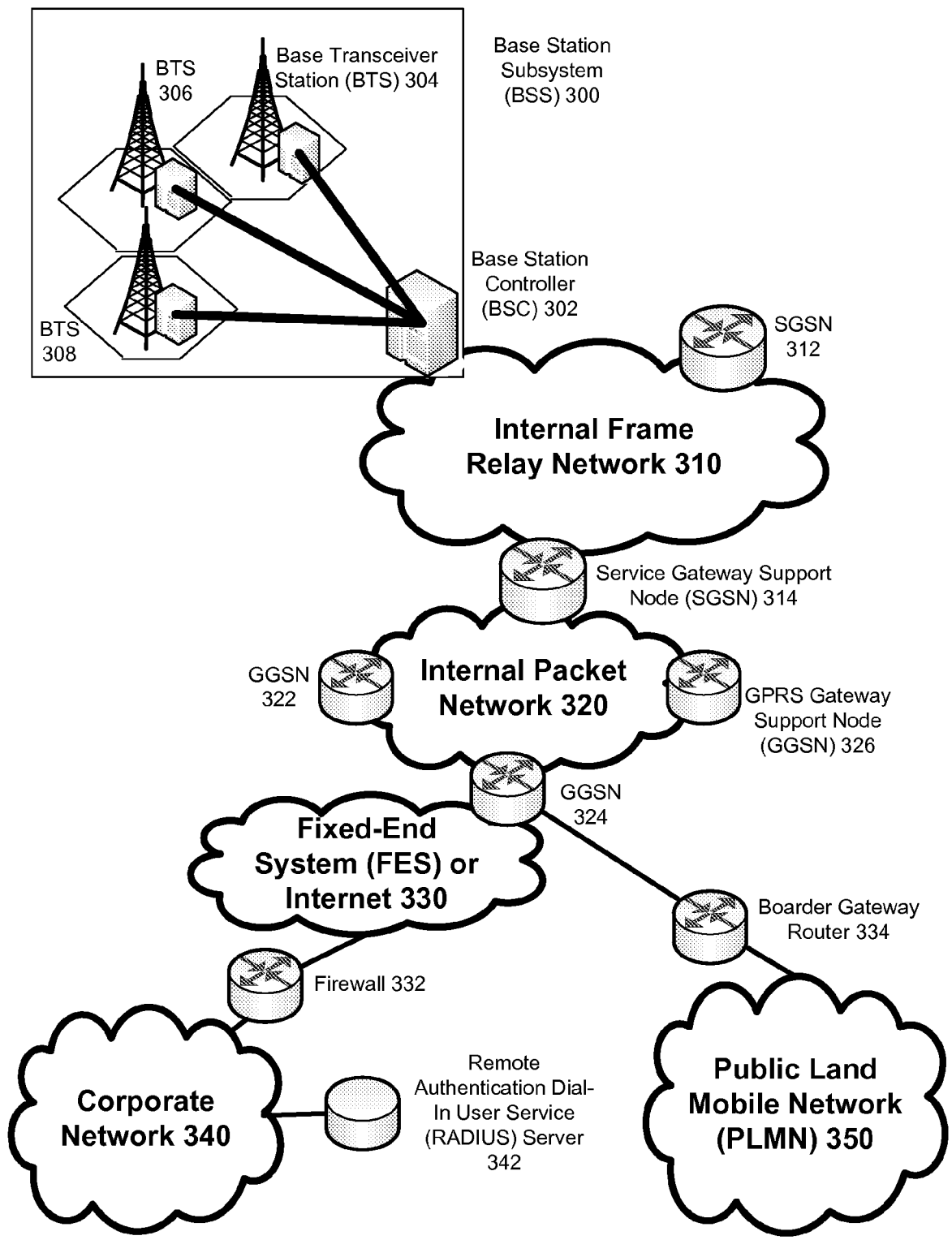
FIG. 3 depicts an overall block diagram of an exemplary packet-based mobile cellular network environment, such as a GPRS network, in which the system for distributing emergency alert information based on subscriber location can be practiced.

FIG. 3 depicts an overall block diagram of an exemplary packet-based mobile cellular network environment, such as a GPRS network, in which the system for providing emergency alert information based on subscriber location can be practiced. In an example configuration, the emergency alert delivery network 354, the wireless data network 356, the wireless network 352, the internet/intranet 364, and the emergency alert network 362, individually or in any combination, are encompassed by the network environment depicted in FIG. 3. In such an environment, there are a plurality of Base Station Subsystems ("BSS") 300 (only one is shown), each of which comprises a Base Station Controller ("BSC") 302 serving a plurality of Base Transceiver Stations ("BTS") such as BTSs 304, 306, and 308. BTSs 304, 306, 308, etc. are the access points where users of packet-based mobile devices (e.g., devices 350) become connected to the wireless network. In exemplary fashion, the packet traffic originating from user devices (e.g., devices 350) is transported via an over-the-air interface to a BTS 308, and from the BTS 308 to the BSC 302. Base station subsystems, such as BSS 300, are a part of internal frame relay network 310 that can include Service GPRS Support Nodes ("SGSN") such as SGSN 312 and 314. Each SGSN is connected to an internal packet network 320 through which a SGSN 312, 314, etc. can route data packets to and from a plurality of gateway GPRS support nodes (GGSN) 322, 324, 326, etc. As illustrated, SGSN 314 and GGSNs 322, 324, and 326 are part of internal packet network 320. Gateway GPRS serving nodes 322, 324 and 326 mainly provide an interface to external Internet Protocol ("IP") networks such as Public Land Mobile Network ("PLMN") 350, corporate intranets 340, or Fixed-End System ("FES") or the public Internet 330. As illustrated, subscriber corporate network 340 may be connected to GGSN 324 via firewall 332; and PLMN 350 is connected to GGSN 324 via boarder gateway router 334. The Remote Authentication Dial-In User Service ("RADIUS") server 342 may be used for caller authentication when a user of a mobile cellular device calls corporate network 340.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 4:
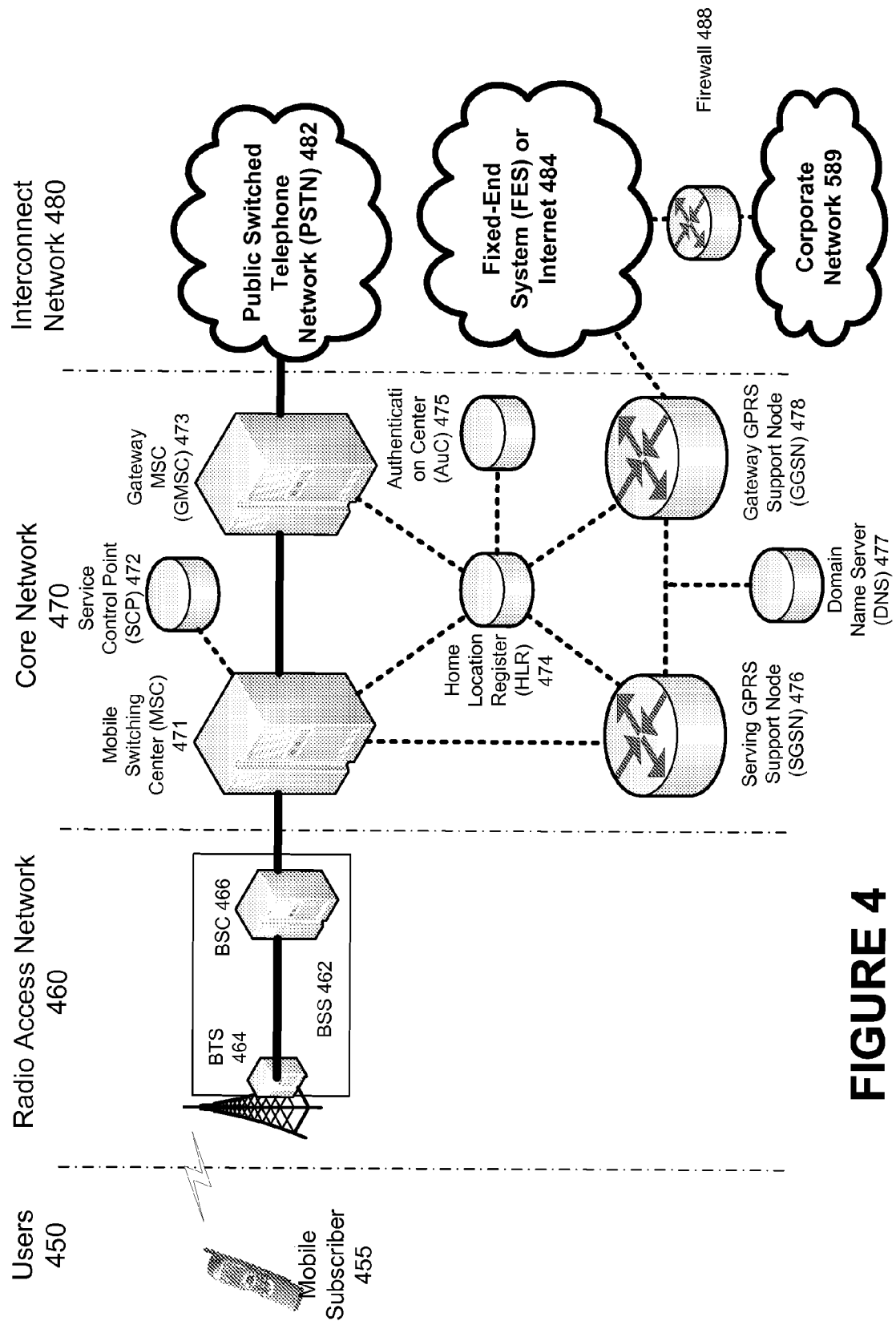
FIG. 4 illustrates an architecture of a typical GPRS network as segmented into four groups.

FIG. 4 illustrates an architecture of a typical GPRS network as segmented into four groups: users 450, radio access network 460, core network 470, and interconnect network 480. In an example configuration the wireless broadcast network 40 is encompassed by the radio access network 460, core network 470, and interconnect network 480. Users 450 comprise a plurality of end users (though only mobile subscriber 455 is shown in FIG. 4). Radio access network 460 comprises a plurality of base station subsystems such as BSSs 462, which include BTSs 464 and BSCs 466. Core network 470 comprises a host of various network elements. As illustrated here, core network 470 may comprise Mobile Switching Center ("MSC") 471, Service Control Point ("SCP") 472, gateway MSC 473, SGSN 476, Home Location Register ("HLR") 474, Authentication Center ("AuC") 475, Domain Name Server ("DNS") 477, and GGSN 478. Interconnect network 480 also comprises a host of various networks and other network elements. As illustrated in FIG. 4, interconnect network 480 comprises Public Switched Telephone Network ("PSTN") 482, Fixed-End System ("FES") or Internet 484, firewall 488, and Corporate Network 489.

A mobile switching center can be connected to a large number of base station controllers. At MSC 471, for instance, depending on the type of traffic, the traffic may be separated in that voice may be sent to Public Switched Telephone Network ("PSTN") 482 through Gateway MSC ("GMSC") 473, and/or data may be sent to SGSN 476, which then sends the data traffic to GGSN 478 for further forwarding.

When MSC 471 receives call traffic, for example, from BSC 466, it sends a query to a database hosted by SCP 472. The SCP 472 processes the request and issues a response to MSC 471 so that it may continue call processing as appropriate.

The HLR 474 is a centralized database for users to register to the GPRS network. HLR 474 stores static information about the subscribers such as the International Mobile Subscriber Identity ("IMSI"), subscribed services, and a key for authenticating the subscriber. HLR 474 also stores dynamic subscriber information such as the current location of the mobile subscriber. Associated with HLR 474 is AuC 475. AuC 475 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the devices 250 used by an end user of the mobile cellular service. When a mobile subscriber turns on his or her mobile device, the mobile device goes through an attach process by which the mobile device attaches to an SGSN of the GPRS network. In FIG. 4, when mobile subscriber 455 initiates the attach process by turning on the network capabilities of the mobile device, an attach request is sent by mobile subscriber 455 to SGSN 476. The SGSN 476 queries another SGSN, to which mobile subscriber 455 was attached before, for the identity of mobile subscriber 455. Upon receiving the identity of mobile subscriber 455 from the other SGSN, SGSN 476 requests more information from mobile subscriber 455. This information is used to authenticate mobile subscriber 455 to SGSN 476 by HLR 474. Once verified, SGSN 476 sends a location update to HLR 474 indicating the change of location to a new SGSN, in this case SGSN 476. HLR 474 notifies the old SGSN, to which mobile subscriber 455 was attached before, to cancel the location process for mobile subscriber 455. HLR 474 then notifies SGSN 476 that the location update has been performed. At this time, SGSN 476 sends an Attach Accept message to mobile subscriber 455, which in turn sends an Attach Complete message to SGSN 476.

After attaching itself with the network, mobile subscriber 455 then goes through the authentication process. In the authentication process, SGSN 476 sends the authentication information to HLR 474, which sends information back to SGSN 476 based on the user profile that was part of the user's initial setup. The SGSN 476 then sends a request for authentication and ciphering to mobile subscriber 455. The mobile subscriber 455 uses an algorithm to send the user identification (ID) and password to SGSN 476. The SGSN 476 uses the same algorithm and compares the result. If a match occurs, SGSN 476 authenticates mobile subscriber 455.

Next, the mobile subscriber 455 establishes a user session with the destination network, corporate network 489, by going through a Packet Data Protocol ("PDP") activation process. Briefly, in the process, mobile subscriber 455 requests access to the Access Point Name ("APN"), for example, UPS.com (e.g., which can be corporate network 489 in FIG. 4) and SGSN 476 receives the activation request from mobile subscriber 455. SGSN 476 then initiates a Domain Name Service ("DNS") query to learn which GGSN node has access to the UPS.com APN. The DNS query is sent to the DNS server within the core network 470, such as DNS 477, which is provisioned to map to one or more GGSN nodes in the core network 470. Based on the APN, the mapped GGSN 478 can access the requested corporate network 489. The SGSN 476 then sends to GGSN 478 a Create Packet Data Protocol ("PDP") Context Request message that contains necessary information. The GGSN 478 sends a Create PDP Context Response message to SGSN 476, which then sends an Activate PDP Context Accept message to mobile subscriber 455.

Once activated, data packets of the call made by mobile subscriber 455 can then go through radio access network 460, core network 470, and interconnect network 480, in a particular fixed-end system or Internet 484 and firewall 488, to reach corporate network 489.

Thus, network elements that can invoke the functionality of providing emergency alert information based on subscriber location can include but are not limited to Gateway GPRS Support Node tables, Fixed End System router tables, firewall systems, VPN tunnels, and any number of other network elements as required by the particular digital network.

Figure 5:
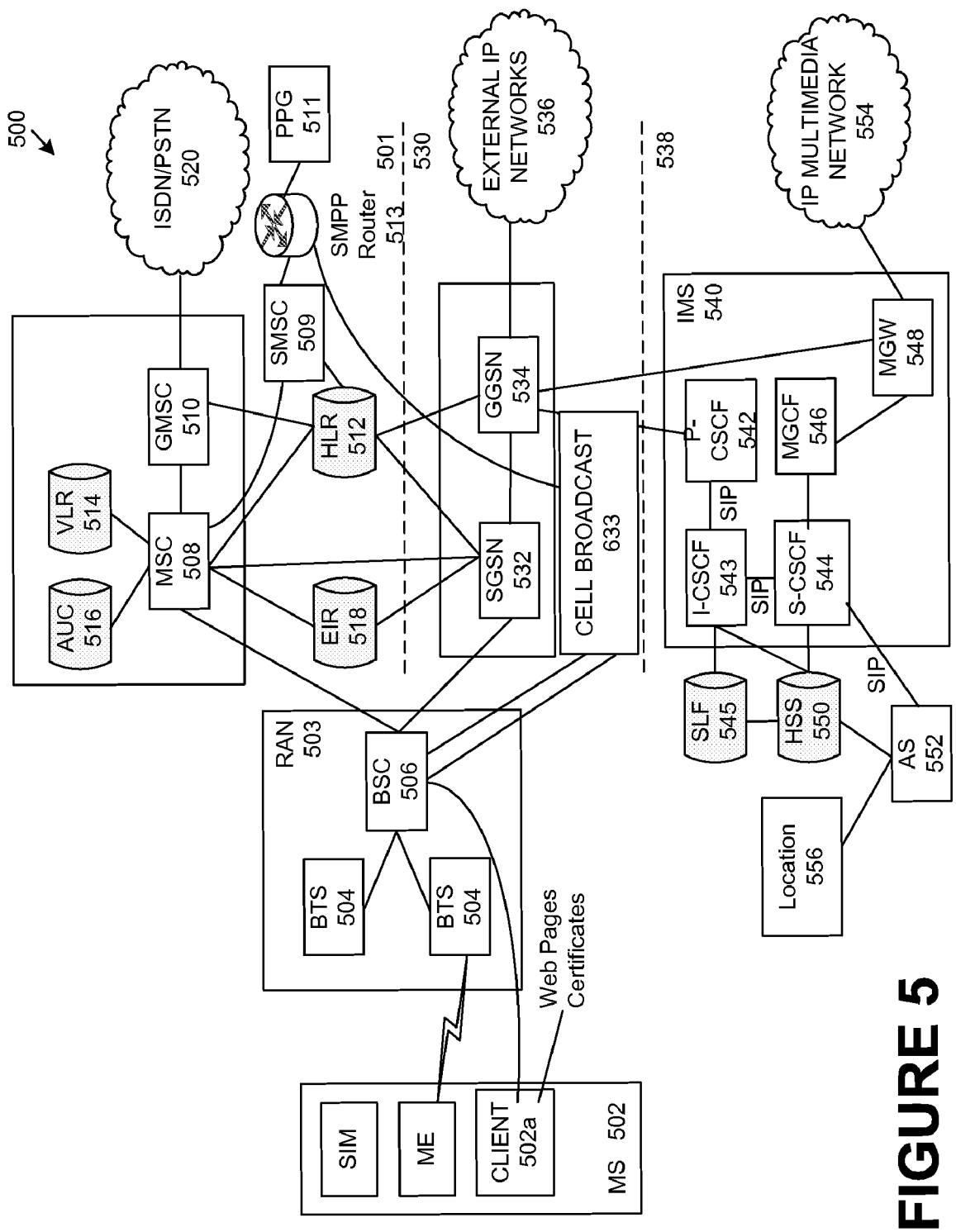
FIG. 5 illustrates an example alternate block diagram of an exemplary GSM/GPRS/IP multimedia network architecture in which distributing emergency alert information based on subscriber location can be accomplished.

FIG. 5 illustrates another exemplary block diagram view of a GSM/GPRS/IP multimedia network architecture 500 in which providing emergency alert information based on subscriber location can be incorporated. In an example embodiment, the wireless network 52 is encompassed by the network architecture 500. As illustrated, architecture 500 of FIG. 5 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer (e.g., devices 50) that is used by mobile subscribers, with a Subscriber identity Module (SIM). The SIM includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network. The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. Thus, the GMSC 510 provides interworking functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

A Short Message Service Center (SMSC) 509 allows one-to-one Short Message Service (SMS) messages to be sent to/from the MS 502. A Push Proxy Gateway (PPG) 511 is used to "push" (i.e., send without a synchronous request) content to the MS 502. The PPG 511 acts as a proxy between wired and wireless networks to facilitate pushing of data to the MS 502. A Short Message Peer to Peer (SMPP) protocol router 513 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532, a cell broadcast and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls.

A Cell Broadcast Center (CBC) 533 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 534 provides a gateway between the GPRS network and a public packet network (PDN) or other IP networks 536. That is, the GGSN provides interworking functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 530 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543, forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of providing emergency alert information based on subscriber location has been described in connection with various computing devices, the underlying concepts can be applied to any computing device or system capable of providing emergency alert information based on subscriber location. The various techniques described herein can be implemented in connection with hardware or software or, where appropriate, with a combination of both. Thus, the methods and apparatus for providing emergency alert information based on subscriber location, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for providing emergency alert information based on subscriber location. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The methods and apparatus for providing emergency alert information based on subscriber location also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing emergency alert information based on subscriber location. When implemented on a general-purpose processor, the program code combines with the processor to provide a unique apparatus that operates to invoke the functionality of providing emergency alert information based on subscriber location. Additionally, any storage techniques used in connection with providing emergency alert information based on subscriber location can invariably be a combination of hardware and software.

While providing emergency alert information based on subscriber location has been described in connection with the various embodiments of the various figures, it is to be understood that other similar embodiments can be used or modifications and additions can be made to the described embodiment for performing the same function of providing emergency alert information based on subscriber location without deviating therefrom. For example, one skilled in the art will recognize that a system for providing emergency alert information based on subscriber location as described may apply to any environment, whether wired or wireless, and may be applied to any number of devices connected via a communications network and interacting across the network. Therefore, providing emergency alert information based on subscriber location should not be limited to any single embodiment, but rather should be construed in breadth and scope in accordance with the appended claims.

What is claimed is:

1. A method comprising:

receiving, at an emergency alert server, an indication of an emergency alert from an emergency alert system;

transmitting, from the emergency alert server, the indication of an emergency alert to a wireless network;

receiving, at the emergency alert server, a request for information from a wireless mobile device, the request comprising an indication of a location of the wireless mobile device;

responsive to receiving the request for the information from the wireless mobile device, the emergency alert server obtaining an address of a supplemental emergency alert information server from a server location database;

transmitting, from the emergency alert server, a request for multimedia content of the information to the supplemental emergency alert information server, the request for multimedia content comprising the indication of the location of the wireless mobile device;

receiving the multimedia content at the emergency alert server; and transmitting the multimedia content from the emergency alert server to the wireless mobile device.

2. A method in accordance with claim 1, further comprising:

receiving, at the emergency alert server, an indication of an alert area associated with the emergency alert; and transmitting the indication of the alert area to the wireless network.

3. A method in accordance with claim 1, further comprising:

receiving, at the emergency alert server, information indicative of a type of intended recipient, wherein the request for the multimedia content comprises the information indicative of the type of intended recipient.

4. A method in accordance with claim 1, wherein the multimedia content comprises at least one of information pertaining to available shelter, information pertaining to medical facilities, information pertaining to a location of supplies, information pertaining to a plume map, information pertaining to an evacuation route, a phone number, and an email address.

5. A method in accordance with claim 1, wherein the request for the multimedia content comprises information relating to a capability for multimedia playback of the wireless mobile device.

6. A method in accordance with claim 1, wherein the wireless mobile device is a subscriber of the emergency alert system.

7. A system comprising at least one processor configured to:

receive an indication of an emergency alert from an emergency alert system;

transmit the indication of an emergency alert to a wireless network;

receive a request for information from a wireless mobile device, the request comprising an indication of a location of the wireless mobile device;

responsive to receiving the request for the information from the wireless mobile device, obtain an address of a supplemental emergency alert information server from a server location database;

transmit a request for multimedia content of the information to the supplemental emergency alert information server, the request for the multimedia content comprising the indication of the location of the wireless mobile device;

receive the multimedia content; and transmit the multimedia content to the wireless mobile device.

8. A system in accordance with claim 7 further configured to:

receive an indication of an alert area associated with the emergency alert; and transmit the indication of the alert area to the wireless network.

9. A system in accordance with claim 7 further configured to:

receive information indicative of a type of intended recipient, wherein the request for the multimedia content comprises the information indicative of the type of intended recipient.

10. A system in accordance with claim 7, wherein the multimedia content comprises at least one of information pertaining to available shelter, information pertaining to medical facilities, information pertaining to a location of supplies, information pertaining to a plume map, information pertaining to an evacuation route, a phone number, and an email address.

11. A system in accordance with claim 7, wherein the request for the multimedia content comprises information relating to a capability for multimedia playback of the wireless mobile device.

12. A system in accordance with claim 7, wherein the wireless mobile device is a subscriber of the emergency alert system.

13. A computer-readable medium, the computer-readable medium not being a transient signal, having stored thereon computer-executable instructions for providing information, the computer-executable instructions comprising instructions for:

receiving an indication of an emergency alert from an emergency alert system;

transmitting the indication of an emergency alert to a wireless network;

receiving a request for information from a wireless mobile device, the request comprising an indication of a location of the wireless mobile device;

responsive to receiving the request for the information from the wireless mobile device, obtaining an address of a supplemental emergency alert information server from a server location database;

transmitting a request for multimedia content of the information to the supplemental emergency alert information server, the request for multimedia content comprising the indication of the location of the wireless mobile device;

receiving the multimedia content; and transmitting the multimedia content to the wireless mobile device.

14. The computer-readable medium in accordance with claim 13, the computer-executable instructions further comprising instructions for:

receiving an indication of an alert area associated with the emergency alert; and transmitting the indication of the alert area to the wireless network.

15. The computer-readable medium in accordance with claim 13, the computer-executable instructions further comprising instructions for:

receiving information indicative of a type of intended recipient, wherein the request for the multimedia content comprises the information indicative of the type of intended recipient.

16. The computer-readable medium in accordance with claim 13, wherein the multimedia content comprises at least one of information pertaining to available shelter, information pertaining to medical facilities, information pertaining to a location of supplies, information pertaining to a plume map, information pertaining to an evacuation route, a phone number, and an email address.

17. The computer-readable medium in accordance with claim 13, wherein the request for the multimedia content comprises information relating to a capability for multimedia playback of the wireless mobile device.

18. The computer-readable medium in accordance with claim 13, wherein the wireless mobile device is a subscriber of the emergency alert system.

* * * * *